United States Patent Office

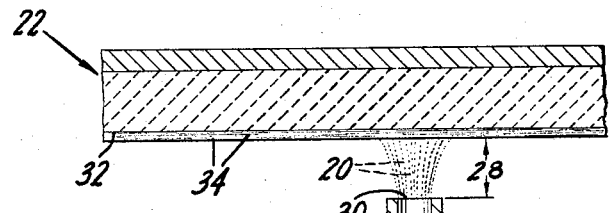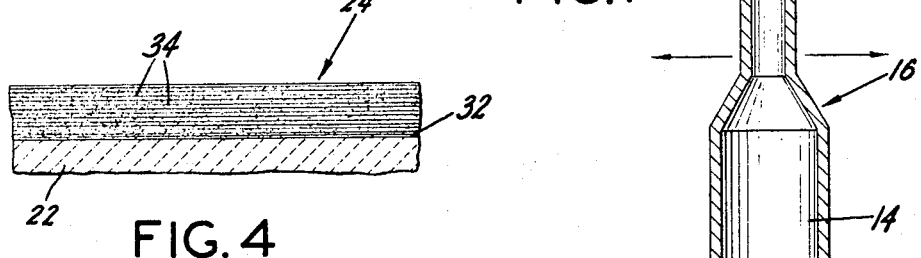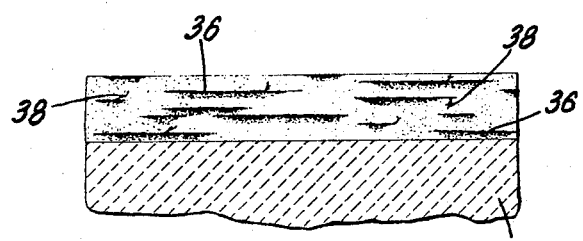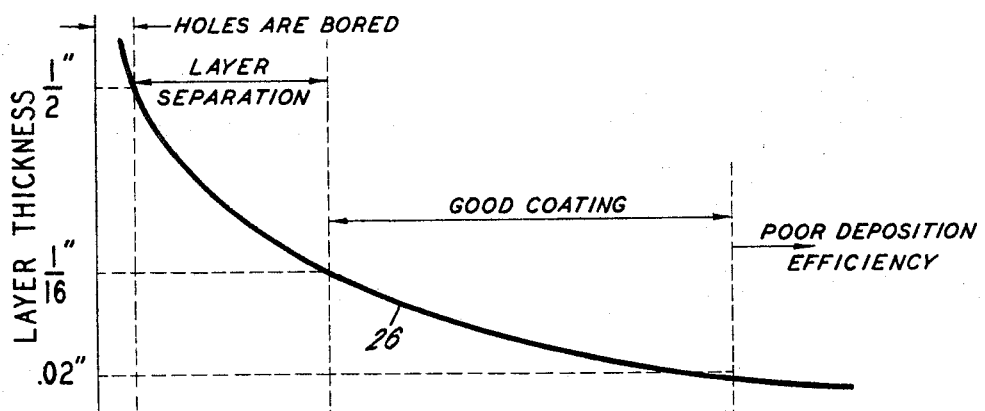

3,399,253
Patented Aug. 27, 1968

3,399,253
METHOD OF MAKING REFRACTORY SHAPES
Richard C. Eschenbach and Edgar F. Stresino, Indianapolis, Ind., assignors to Union Carbide Corporation, a corporation of New York
Filed Mar. 28, 1966, Ser. No. 537,889
1 Claim. (Cl. 264—30)

ABSTRACT OF THE DISCLOSURE

Method of making refractory shapes by a spray process which comprises heating a metal oxide powder in an internal combustion zone to plasticize the particles thereof, discharging the heated particles from said zone as a spray, moving the spray transversely of a selected base at a speed such that a substantially gas-free layer of such particles having a maximum thickness of about ½ inch is formed by the first pass on base, and similarly operating such spray to form fused overlapping layers of refractory particles, each layer having a thickness of about $\frac{1}{16}$ inch, until a substantially solid refractory shape of desired thickness results.

---

This invention relates to refractory shapes, and more particularly to a method of making thick (½″ or greater) shapes such as bricks of oxides of metals selected from the class consisting of calcium, chromium and magnesium.

The invention provides a method of making refractory shapes composed of oxides of metals selected from the class consisting of calcium, chromium and magnesium, which comprises feeding a combustible mixture of oxygen and fuel as well as the metal oxide powder to an internal combustion burner in which the powder is heated to plasticize the particles thereof; discharging the resulting plastic particles from such burner through a confined outlet passage as a spray; applying such spray first against a selected base while moving the spray transversely of said base at a speed such that a substantially gas-free layer of such particles is formed by the first pass on base; and similarly operating such spray to form fused overlapping layers of refractory particles until a substantially solid refractory shape of desired thickness results.

The life of a furnace lining is limited by its ability to withstand the severe operating conditions to which it is subjected. In the steel industry, for example, the furnaces wherein the molten steel is produced deteriorate rapidly, because of the inability of prior furnace linings to withstand the tremendous heat and pressures imposed on such linings. Indeed, it is necessary at great expense, periodically, to completely cool down the furnace so that the furnace lining can be almost completely rebuilt. Since a fairly long time for cooling and reheating is required to avoid damaging the furnace brick work, this represents a serious loss of time and money.

Such deterioration of the furnace is for the most part due to the structure of the bricks themselves. Prior art bricks consist of a material having a very porous structure. This inherently means that the bricks are easily susceptible to corrosion and penetration of slag and molten metal.

The aforesaid rebuilding of the furnace lining can in many cases be delayed for substantial periods of time by patching localized defective areas before such areas become enlarged. Various ways and means are constantly being sought by the industry to accomplish this patching with a minimum of effort.

The most efficient way to patch these furnaces or to apply new linings is to apply a dry refractory powder to the lining of the furnace while the lining is still hot, the refractory being applied in a plastic or molten state in order to secure a good bond with the old lining. The term "dry powder" is herein used to mean powder that is capable of being applied without the aid of a liquid binder. By this method, not only will a good secure patch be obtained but it will not be necessary to cool the furnace down to apply the refractory. This method also permits a greater area of the furnace lining to be covered. Furthermore, better fusion and hence greater density is obtained between the particles. This prevents the molten metals and slag being heated in the furnace from penetrating the lining. The lining, therefore, has great corrosion resistance.

One of the prime difficulties in using prior processes for making relatively thick coatings is that of splitting of the coating as the material is built up on the base. More particularly, it has been found that relatively large voids are created, especially for the specific materials of the invention, when coating thicknesses greater than ½ inch are applied to a suitable base. This difficulty of course, makes it difficult, if not impossible, to form relatively thick refractory shapes such as those needed for furnace lining.

It is, therefore, the principal object of the present invention to make relatively thick (>½″) refractory shapes of oxides of metals selected from the class consisting of calcium, chromium, and magnesium.

For the purpose of this invention, the term "shape" is meant to include, but not be limited to, bricks, panels, furnace linings, and patches applied to existing furnace linings.

Another object of the invention is to provide a refractory shape, or more specifically a panel or brick having a thickness greater than ½ inch, and having a very dense, lamellar overlapping leaf structure able to withstand corrosion, spalling and thermal shock substantially better than in the past.

Still another object is to provide improved bricks for lining continuous steel making furnaces that substantially increase the time of operation thereof.

In the drawings:
FIGURE 1 is a view mainly in section of a burner operated to perform the invention;
FIGURE 2 is a characteristic curve of layer thickness/traverse speed;
FIGURE 3 is a cross section of a shape showing undesirable cracks; and
FIGURE 4 is a similar shape made according to the invention.

As shown in FIGURE 1, dry refractory powder 10 of the class consisting mainly of calcia, chromia, and magnesia, and a fluid combustible mixture 12 of oxygen and fuel, such as fuel oil, are introduced under pressure into the confined combustion space 14 of a combustion burner 16, heating at least a portion of the oxides to a temperature sufficiently high to plasticize the particles, by burning the fluid combustible mixture in said space in the presence of the particles of such oxides. The so-heated plastic particles are then discharged through the constricted outlet passage 18 of the burner as a spray 20. The spray 20 is applied onto a base 22 while traversing said burner 16 back and forth across said base so as to build up overlapping layers, the thickness of each being critically controlled so as to form a relatively thick shape without undesirable cracks or voids in the final shape 24.

The thickness of each layer is carefully controlled, otherwise undesirable cracks or layer separation will occur.

As previously stated, in order to form the relatively thick refractory shapes of the invention, the thickness of each layer must be precisely controlled. For a given size of internal combustion burner, each layer thickness preferably is controlled by the traverse speed of the spray as it passes back and forth across the surface of the base or substrate.

FIGURE 2 shows a characteristic curve 26 that depicts the relationship of the thickness per layer to the traverse speed for a given size burner at a constant stand-off distance 28, FIGURE 1 between the burner exit 30 and the work.

The first layer 32, FIGURE 1, should not exceed ½ inch in thickness to avoid entrapment of gas. However, as shown by the graph 26, when building up layers 36, each layer thickness is controlled so that it does not exceed about 1/16 inch in thickness. When the layers 34 exceed this thickness, gases evolving from the coating materials cannot escape, thus causing undesirable cracks or voids to be created. Also, when the traverse speed reaches the point where the thickness of a layer becomes relatively thin, the deposition efficiency becomes exceedingly low; due primarily to improper heating of the base.

FIGURE 3 illustrates the effect of improper control of the layer thickness; that is cracks 36 and 38 occur when an individual layer becomes too thick, and clearly shows the layer separation.

A brick 40 made according to the invention is shown in FIGURE 4. This brick consists of particles of oxide that are welded together in substantially uniform layers that are visibly free of cracks between layers as well as within layers. Thus the invention results in a superior shape, since crumbling and disintegration thereof in use due to cracks are avoided.

Aluminum powder may be fed to the combustion chamber along with the metal oxide powder to enhance the combustion. Also the fuel may be in the form of a slurry of oil containing the powder, or any suitable fluidized fuel, or gas such as acetylene, without departing from the invention.

What is claimed is:

1. Method of making refractory shapes composed of oxides of metals selected from the class consisting of calcium, chromium and magnesium, which comprises feeding a combustible mixture of oxygen and fuel, as well as the metal oxide powder to an internal combustion burner in which the powder is heated to plasticize the particles thereof, discharging the resulting plastic particles from such burner through a confined outlet passage as a spray, applying such spray first against a selected hot base while moving the spray transversely of said base at a speed such that a substantially gas-free layer of such particles having a maximum thickness of about ½-inch is formed by the first pass on base, and similarly operating such spray to form fused overlapping layers of refractory particles, each overlapping layer having a thickness of about 1/16-inch, until a substantially solid refractory shape having a minimum overall thickness of ½ inch results.

References Cited

UNITED STATES PATENTS

| | | |
|---|---|---|
| 2,771,376 | 11/1956 | Capellman. |
| 3,093,458 | 6/1963 | Demaison _____ 264—30 |
| 1,125,741 | 1/1915 | Schwarz _____ 264—30 |
| 2,714,563 | 8/1955 | Poorman et al. |
| 2,861,900 | 11/1958 | Smith et al. |
| 2,904,449 | 9/1959 | Bradstreet _____ 117—105.2 |
| 2,968,083 | 1/1961 | Lentz et al. _____ 264—30 |

FOREIGN PATENTS 402,203   11/1933   Great Britain.

OTHER REFERENCES

Bulletin 136 B, The Metco Flame Spraying Processes, 1960, Metallizing Engineering Co., Westbury, N.Y., 12 pages.

ROBERT F. WHITE, *Primary Examiner.*

J. H. SILBAUGH, *Assistant Examiner.*